United States Patent
Perlman

(10) Patent No.: US 6,169,879 B1
(45) Date of Patent: Jan. 2, 2001

(54) SYSTEM AND METHOD OF INTERCONNECTING AND USING COMPONENTS OF HOME ENTERTAINMENT SYSTEM

(75) Inventor: Stephen G. Perlman, Mountain View, CA (US)

(73) Assignee: WebTV Networks, Inc., Mountain View, CA (US)

( * ) Notice: Under 35 U.S.C. 154(b), the term of this patent shall be extended for 0 days.

(21) Appl. No.: 09/244,222

(22) Filed: Feb. 4, 1999

Related U.S. Application Data

(63) Continuation-in-part of application No. 09/154,609, filed on Sep. 16, 1998.

(51) Int. Cl.⁷ .................................................. H04N 7/16
(52) U.S. Cl. .................................................. 455/6.2; 348/8
(58) Field of Search .............................. 455/6.2, 6.3, 6.1, 455/5.1, 4.2; 348/6, 7, 12, 13, 10, 11; 439/498, 502, 63, 166; 709/217, 218, 219; 345/327; H04N 7/173, 7/16, 7/10

(56) References Cited

U.S. PATENT DOCUMENTS

| | | | |
|---|---|---|---|
| 5,548,338 | 8/1996 | Ellis et al. | 348/473 |
| 5,572,263 * | 11/1996 | Kim et al. | 348/705 |
| 5,579,055 | 11/1996 | Hamilton et al. | 348/476 |
| 5,585,837 * | 12/1996 | Nixon | 348/6 |
| 5,619,247 | 4/1997 | Russo | 348/3 |
| 5,640,453 | 6/1997 | Schuchman et al. | 380/10 |
| 5,835,126 | 11/1998 | Lewis | 348/8 |
| 5,867,223 * | 2/1999 | Schindler | 348/552 |
| 5,880,768 | 3/1999 | Lemmons et al. | 348/1 |
| 5,886,732 * | 3/1999 | Humplemann | 348/10 |

* cited by examiner

*Primary Examiner*—Chris Grant
(74) *Attorney, Agent, or Firm*—Workman, Nydegger, Seeley

(57) ABSTRACT

Apparatus, systems, and methods for interconnecting multiple consumer electronics devices in a home entertainment system. The consumer electronics devices are connected in a hub and spoke configuration, with each one being directly connected to a central electronics device. The central electronics device includes multiple identical, interchangeable jacks, each of which can receive cables connected to any of the consumer electronics devices, thereby significantly simplifying the process of connecting the components of the home entertainment system. The jacks are compatible with S-video and RCA video cables, such that the user does not need to understand the differences between these cables. In the hub and spoke configuration, all signals in the home entertainment system are accessible by the central electronics device. Accordingly, the central electronics device can process, route, or otherwise respond to any signal. For example, any video or audio signal can be routed to a VCR, where it can be recorded.

24 Claims, 14 Drawing Sheets

SYSTEM AND METHOD OF INTERCONNECTING AND USING COMPONENTS OF HOME ENTERTAINMENT SYSTEM

RELATED APPLICATION

This application is a continuation-in-part of U.S. patent application Ser. No. 09/154,609, filed Sep. 16, 1998, and entitled "System for Enhanced Entertainment System Control", which is incorporated by reference.

BACKGROUND OF THE INVENTION

1. The Field of the Invention

The present invention relates to managing a plurality of interconnected consumer electronics devices. More specifically, the present invention is directed to devices, systems and methods that allow for and enhance the management of an interconnection of a television set or another display device and various consumer electronics devices such as VCRs, stereo systems, video disk players, satellite receivers, cable boxes, video game players, and Internet terminal devices.

2. The Prior State of the Art

The television has been a source of entertainment for individuals since its introduction and traditionally has been a fairly simple device for users to set up and connect. A user simply unboxed the television, connected the antenna, plugged in the power cord and turned on the television. Once on, a user could control the functions of the television by adjusting dials or buttons on the television or sending information to the television via a remote control.

Since the inception of television, other consumer electronics devices that may be connected to a television have been introduced. For instance, VCRs, video disk players, and video game devices provide enhanced entertainment. Cable television services and satellite receivers along with traditional broadcast antennas provide reception of video programming. Home theater systems provide surround sound and near theater quality audio. Internet terminals, such as WebTV boxes developed by WebTV Networks, Inc., of Mountain View, Calif., allow consumers to connect to the Internet and to send and receive information, using a television as the display device. Using the foregoing electronic consumer devices or others in combination with a television, consumers can now select and configure a wide variety of home entertainment systems.

Although many consumer electronics devices now exist, connecting, continuing, and managing multiple devices in order to realize the full benefit of each component of a home entertainment can be extremely difficult and frustrating. The interconnection of the devices requires a variety of types of connectors that vary dramatically from device to device. Connectors include coaxial cables, a variety of RCA-type connectors for audio and/or video, S-video connectors, and so forth. Further limitations are introduced to the home entertainment system if the devices being used run on the various video and audio standards of foreign countries, since the standards may not be compatible with each other.

One of the most difficult tasks for a user of a home entertainment system is to determine how to interconnect multiple electronic consumer devices such that each is appropriately connected to the television. As the number of devices to be connected to the television increases, the sense of frustration on the part of the user can escalate. In fact, various configurations can be so complicated that users refuse to consider purchasing additional consumer electronics devices because they cannot figure out how to connect and manage them together. Even in properly configured and interconnected home entertainment systems, the performance of many devices suffer when the television is connected to multiple devices. The overall result of the increasingly diverse types of consumer electronics devices that may be included in home entertainment systems is often confusion, suboptimal performance, or a less than ideal user experience.

The conventional method for connecting devices in a home entertainment system is the "daisy chain" method. To illustrate the conventional daisy chain method and the magnitude of its limitations, reference will now be made to FIGS. 1–3, which depict an increasing level of complexity as consumer electronics devices are added to a home entertainment system. FIG. 1 illustrates a basic configuration that enables a user to access television without any scrambled channels and to access the Internet. A television antenna jack 14 is connected to an Internet terminal 12, which can be a special-purpose computer system that enables Internet access and permits a user to browse and retrieve information from the Internet to the television screen. One such Internet terminal is the previously-mentioned WebTV box. Internet terminal 12 is in turn connected to a television 10. Both Internet terminal 12 and television 10 are connected to an A/C power jack 18. Internet terminal 12 is also connected to a telephone jack 20. A remote control 16 enables the user to provide input to the Internet terminal 12. In this basic configuration, the user experience is generally relatively high. The greatest potential source of confusion is introduced by the many ways to connect the television 10. The user typically has to match the television output of Internet terminal 12 with the corresponding channel, such as channel 2, 3 or 4, of television 10. In addition, depending on the television programming signal available and the nature of the components of the home entertainment system, the connection between Internet terminal 12 and television 10 may be established by coaxial cable, RCA cables, or S-video cables. Once the appropriate connections are established, the home entertainment system of FIG. 1 operates on a relatively intuitive and understandable way.

As one more device is introduced into the home entertainment system, the user experience is often significantly diminished. If one or more of the channels are scrambled or if the cable feed is digital, the home entertainment system must include a cable box, as illustrated in FIG. 2. The cable television jack 24 is connected to a conventional cable box 22, which is connected to Internet terminal 12. which is connected in turn to television 10. Internet terminal 12 and television 10 are also connected to the an A/C power jack 18, while Internet terminal 12 is further connected to a telephone jack 20. In order to allow a user to change channels and control the various devices by remote control 16, Internet terminal 12 may incorporate a mechanism that prevents the user from having to use a separate remote control for each consumer electronics device and enables components of the home entertainment system to be controlled even if they are not in the line of sight of remote control device 16. For example, Internet terminal 12 can have an associated IR blaster (an infrared emitter) 26 for relaying remote control signals from Internet terminal 12 to one or more other consumer electronics devices. In the example of FIG. 2, the user can change channels on cable box 22 by transmitting the appropriate signal from remote control device 16 to Internet terminal 12. Internet terminal 12 then relays the signal to cable box 22 using IR blaster 26.

The interdevice connection required for the cable television and Internet access illustrated in FIG. 2 introduces several problems and limitations. This configuration requires not only the television 10 be tuned to the appropriate input channel, but also Internet terminal 12 be properly tuned. The difficulty of connecting the devices of FIG. 2 is compounded by the fact that television 10 and the Internet terminal 12 may need to be tuned to different channels. Therefore, when Internet terminal 12 is turned off and the cable box signal is "passed through" to television 10, an unexpected television channel from cable box 22 may appear on the television.

Despite its usefulness, IR blaster 26 further complicates the task of configuring the home entertainment system. In particular, the user must position IR blaster 26 so that IR receiver 28, located on the cable box 22, can receive the signal from the IR blaster. This sometimes requires significant trial and error. Further, signals from remote control 16 sometimes interfere with the signals emitted from IR blaster 26, causing an undesired response from cable box 22.

Adding yet another consumer electronics device to the home entertainment system has been associated with an unacceptable level of complexity for many users who practice conventional interconnection techniques. In one example, FIG. 3 illustrates a conventional configuration 8 that includes a VCR. The daisy chain includes cable television jack 24, cable box 22, VCR 30, Internet terminal 12, and television 10. Internet terminal 12, television 10, and VCR 30 receive power by being each connected to A/C power jack 18 via adapter 32. Internet terminal 12 is also connected to a telephone jack 20, an IR blaster 26 for relaying remote control signals to IR receiver 28 on cable box 22, and another IR blaster 34 for relaying remote control signals to IR receiver 36 on VCR 30. The difficulty of understanding how to connect and operate the home entertainment system of FIG. 2 is exacerbated by the addition of VCR 30 of FIG. 3.

In this configuration, VCR 30, Internet terminal 12, and television 10 each needs to be tuned to channel 2, 3, or 4. The user can experience confusion as different channels appear on television 10, depending on which devices are on or off. Additionally, VCRs generally have a function which allows the user to either pass through the RF from the cable box 22 or use the internal tuner of the VCR. Thus, it can be difficult for Internet terminal 12 to determine whether an incoming signal is transmitted form cable box 22 or from the tuner within VCR 30. The user of the home entertainment system of FIG. 3 must program Internet terminal 12 to control cable box 22 and VCR 30, as well as program remote control 16 to control television 10. There is also the possibility that signals from remote control 16 could interfere with those emitted from IR blaster 26 and IR blaster 34. The specific order of devices in the daisy chan of FIG. 3 limits how the devices can interoperate. For instance, VCR 30 can record the output of cable box 22, but not the output of Internet terminal 12. Certain imaginative uses of VCR 30 cannot be practiced because of the specific daisy chain configuration required in the system of FIG. 3, in which some video output, such as that generated by Internet terminal 12, is not received by the VCR.

It can be understood that the home entertainment system configurations of FIGS. 1–3 represent only a small number of the many configurations that are possible. Many multiple-device systems that do not include an Internet terminal likewise suffer from complex interconnection configurations that limit their use by consumers and otherwise prevent multiple consumer electronics devices from being advanta- geously used in combination. The basic problems illustrated in FIGS. 1–3 can be expected to deepen as new consumer electronics devices are developed and marketed.

It would, therefore, be an advancement in the art to simplify the method of connecting various consumer electronics devices one with another. It would also be an advancement in the art to provide a technique for centrally controlling multiple devices and allowing the devices to interoperate. Such advancements would increase the ease of use of multiple consumer electronics devices and would enable users to experience the full functionality of the devices, as well as allowing the devices to be used synergistically in novel ways.

SUMMARY AND OBJECTS OF THE INVENTION

The present invention relates to systems and methods for interconnecting consumer electronics devices in a home entertainment system, wherein multiple electronics devices are directly connected to a central device in a hub and spoke configuration. The invention further extends to the central device that is capable of interconnecting the consumer electronics devices in the hub and spoke configuration. The invention also includes methods for interconnecting the consumer electronics device so as to enable a video recording system to record video output from any desired electronics device, such as a cable box, a digital satellite system, an Internet terminal, a video game console, and the like. Home entertainment systems configured according to the invention are flexible, offer improved interoperability of components, and are easily set up, expanded, and maintained compared to those configured according to conventional techniques.

In one implementation of the invention, multiple consumer electronics devices are connected to a central device. The central device has multiple, identical and interchangeable jacks that can receive cables connected to the consumer electronics devices. Because the interchangeable jacks are identical, the user does not need to understand specific connection requirements for the various consumer electronics devices. Instead, the user must merely remember that an appropriate cable must be connected between input or output ports on the consumer electronics device and to any desired jack on the central electronics device. Connecting components of a home entertainment system in this manner is significantly less complicated than the daisy chain configuration of the prior art.

Because the central device is interposed between any two other consumer electronics devices in the hub and spoke configuration, any signals transmitted in the home entertainment system must pass through the central electronics device. The central electronics device can process, route, or otherwise respond to the signals in novel ways. For instance, any video or audio signal can be routed to and recorded by a VCR In contrast, many video signals in conventional daisy chain configurations are not accessible by the VCR. For instance, in FIG. 3, video signals generated by Internet terminal 12 are not accessible by VCR 30.

The identical, interchangeable jacks of the invention are compatible with cables that transmit S-video signals or RCA video signals. Accordingly, when a user connects a television set or another consumer electronics device to the central electronics device, the user does not need to understand the difference between S-video and RCA connections. The user merely needs to know enough to identify the appropriate cable and connect it to the television set and one of the identical jacks. Moreover, the user does not need to understand how video signals are passed from a cable jack to a cable box and to the television and, optionally, through a VCR. Instead, the hub and spoke configuration requires the user only to understand that each device should be connected to the central electronics device.

The invention also extends to central electronics devices having the features that allow them to be used in the hub and spoke configurations disclosed herein. The central electronics devices contain hardware and computer-executable instructions for sensing which cable is connected to each of the identical jacks and for formatting or responding to signals passing through the jacks.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a pore particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
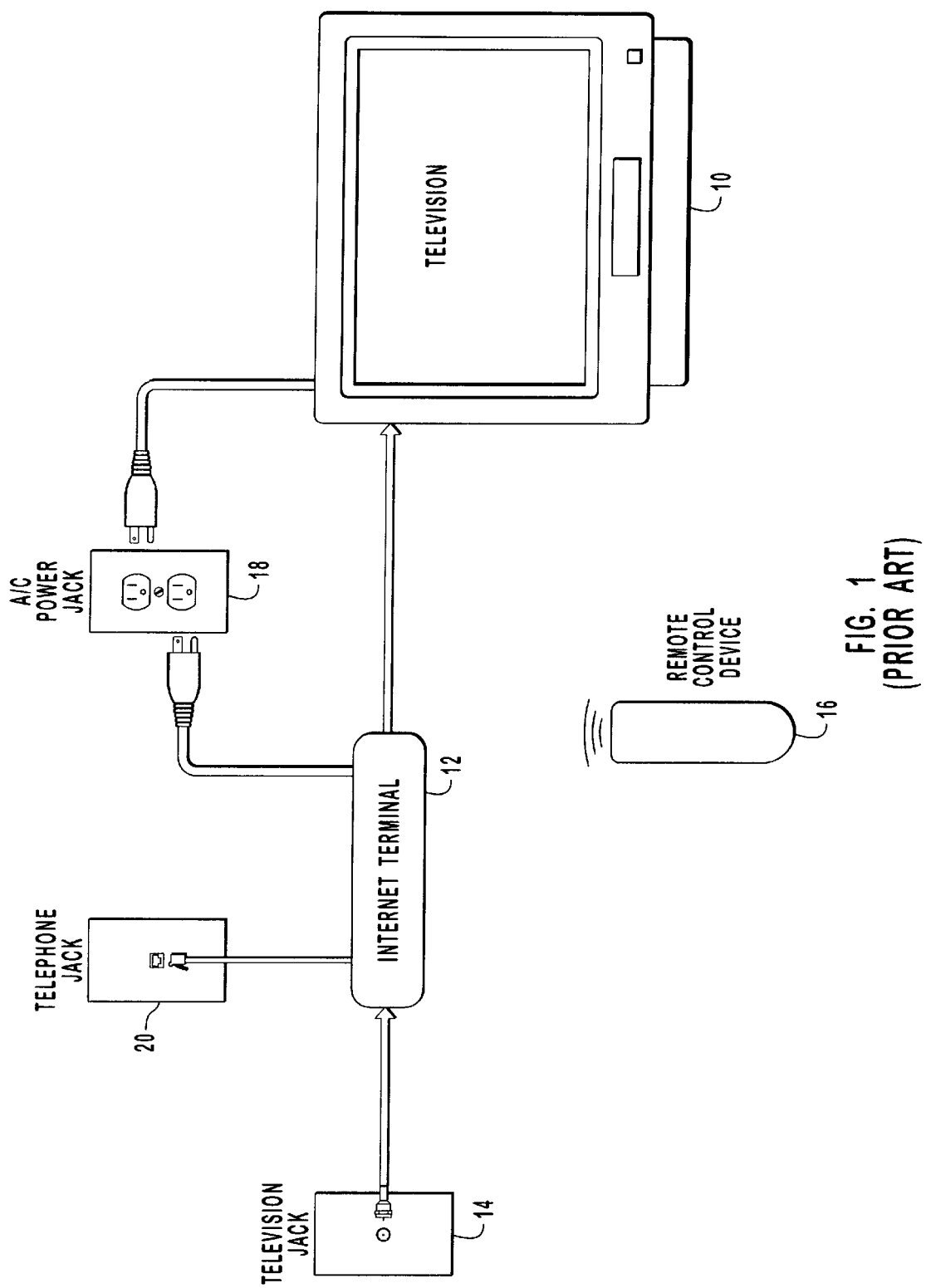
FIG. 1 is a schematic diagram illustrating a conventional configuration for a home entertainment system in which an Internet terminal is connected to a television.

The present invention relates to systems and methods for interconnecting consumer electronics devices in a home entertainment system, wherein multiple electronics devices are directly connected to a central device in a hub and spoke configuration. The invention further extends to the central device that is capable of interconnecting the consumer electronics devices in the hub and spoke configuration. In addition, according to one embodiment of the invention, the techniques for interconnecting the consumer electronics device enable a video recording system to record video output from any desired electronics device, such as a cable box, a digital satellite system, an Internet terminal, a video game console, and the like. Home entertainment systems configured according to the invention are flexible, offer improved interoperability of components, and are easily set up, expanded, and maintained compared to those configured according to conventional techniques.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a special purpose or general purpose computer including various computer-executable instructions or computer hardware, as discussed in greater detail below.

The invention will be described below in reference to consumer electronics devices included in a home entertainment or information retrieval system. In this context, "consumer electronics device" or "electronics device" is used to refer to any number or type of various consumer electronics devices that provide audio output, video output, or information services or can be connected to a television set. Such devices include, but are not limited to, cable boxes, satellite receivers, video cassette recorders (VCRs), video game consoles, video disk players. home theater equipment, home stereo equipment, Internet terminals, personal computers, and television sets. "Home entertainment system" refers to a system that includes one or more consumer electronics devices and provides audio and/or video output to a user and is not limited to those that are used in residential buildings. "Information retrieval system" refers to a system that includes one or more consumer electronics devices and provides Internet or other information services to a user.

Certain embodiments within the scope of the present invention include computer-readable media having computer-executable instructions or data fields stored thereon. Such computer-readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired computer-executable instructions or data fields and which can accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. In some contexts, the computer-executable instructions will be described as program modules being executed by a computer or processor within a consumer electronics device. Generally, program modules include routines, programs, objects, components, data structures, etc. that perform particular tasks or implement particular abstract data. The computer-executable instructions, associated data structures, and program modules represent examples of the program code means for executing the steps of the methods disclosed herein.

Exemplary Computing Environment

Figure 4:
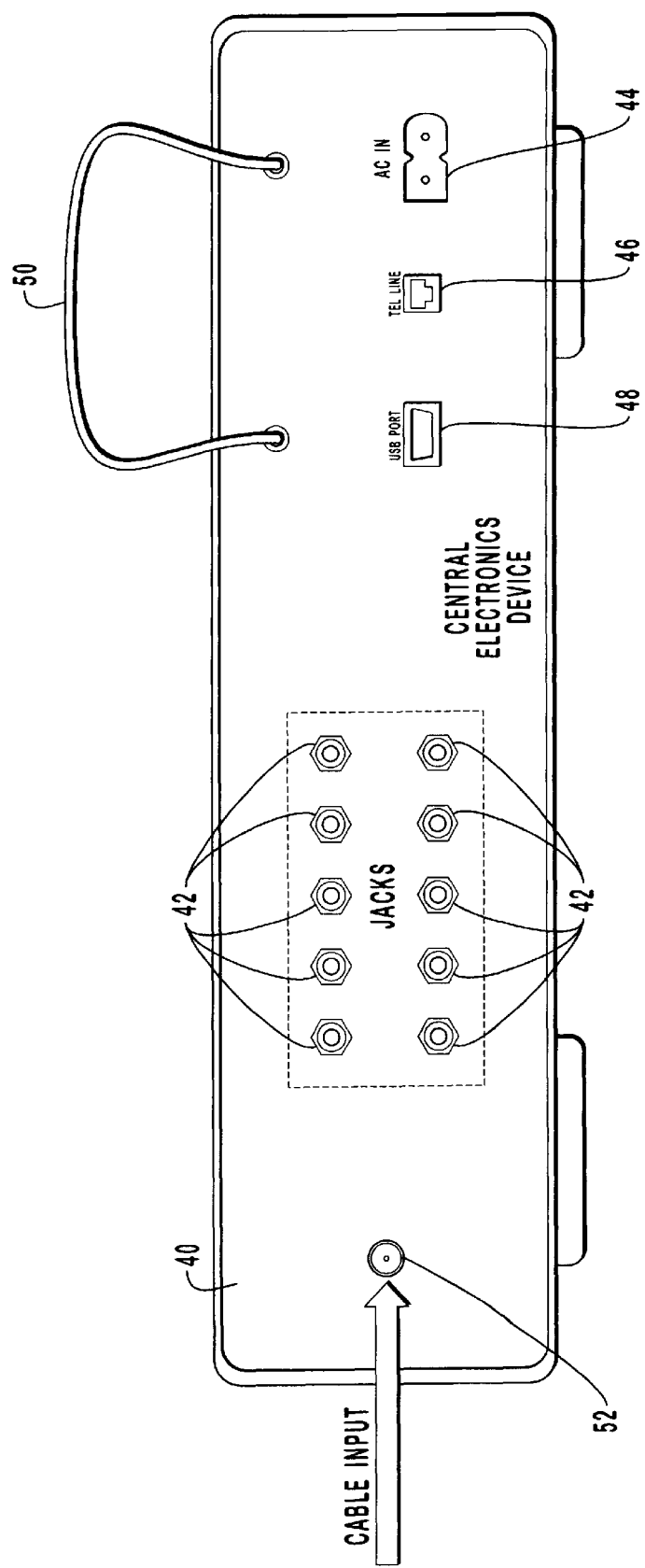
FIG. 4 is an elevation view of a back panel of a central electronics device according to one embodiment of the invention, illustrating a plurality of identical, interchangeable jacks.
Figure 5:
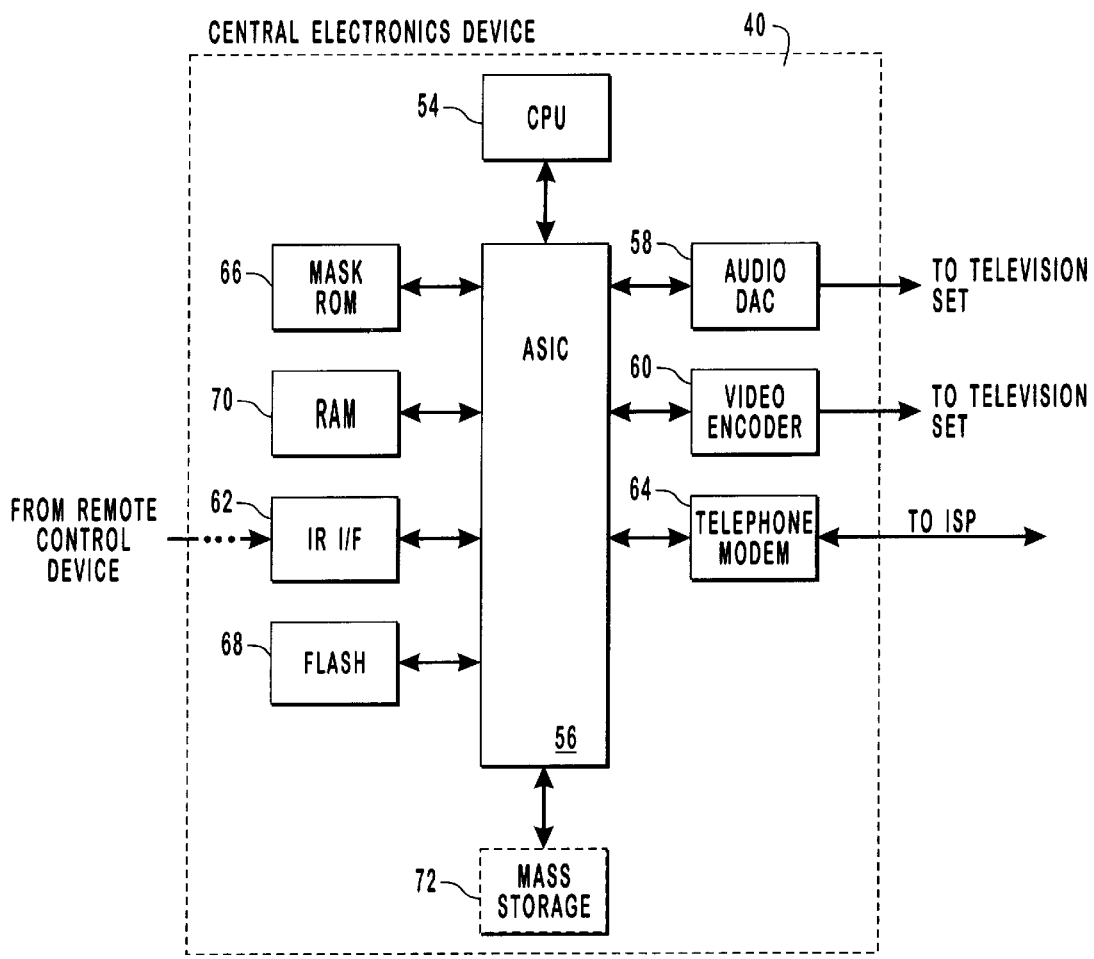
FIG. 5 is a schematic diagram illustrating the components of a central electronics device that provide Internet access.

FIGS. 4 and 5 illustrate an example of a central electronics device according to the invention. A "central electronics device" is any consumer electronics device that can function as a central device in a hub and spoke architecture of a home entertainment or information retrieval system as disclosed herein. In the embodiment of FIGS. 4 and 5, the central electronics device also functions as an Internet terminal. However, in other embodiments, the central electronics device can merely function as a central device in the hub and spoke architecture or can instead provide additional functions by being integrated in any other consumer electronics device.

FIG. 4 illustrates the back panel of a central electronics device 40. Central electronics device 40 includes means for electrically connecting each of a plurality of electronics devices to the central electronics device in a hub and spoke configuration. Jacks 42 represent one example of such means. Each of the jacks 42 is an identical connector that can be used to connect any of the plurality of consumer electronics devices to the central electronics device. Unlike the separate audio, RCA cable, S-video, and other connectors typically found in conventional electronics devices, jacks 42 can be used to transmit or receive any of a variety of video, audio, or data signals from the consumer electronics devices. For instance, any particular jack 42 can function with stereo or mono audio signals, S-video signals, or RCA signals. This capability is described in greater detail below and enables central electronics device 40 to conveniently interconnect cable boxes, satellite receivers, video tape recorders, video game consoles, video disk players, home theater equipment, home stereo equipment, television sets, and other consumer electronics devices without the user having to understand the different cables and connection techniques that have been conventionally used in home entertainment systems. The number of jacks 42 can be enough to provide input to or output from each of the other consumer electronics devices included in the home entertainment system. While ten to twelve jacks 42 have are often enough to support a reasonably complex home entertainment system, the number may be greater or smaller depending on the number of other consumer electronics devices.

Central electronics device 40 further includes an AC power input 44, a phone jack 46 (to support the optional Internet access or other information services), and optionally a universal serial bus (USB) port 48 and a digital terrestrial antenna 50. A coaxial cable input 52 receives cable television signals from a cable provider.

The features of central electronics device 40 that permit interconnection of the consumer electronics devices included in a home entertainment system can be integrated with the components of an Internet terminal as illustrated in FIG. 5. For instance, central electronics device 40 can include the Internet access and data processing components that have been found in Internet terminals that use television sets as display devices. In one example, central electronics device can be a WebTV box that has been modified to function as a central device in a hub and spoke configuration.

FIG. 5 illustrates components of central electronics device 40 that are used to provide information retrieval services. Central electronics device 40 includes hardware and computer-executable instructions for providing the user with a graphical user interface, by which the user can access Internet resources, send and receive e-mail, and optionally receive other information services. Operation of central electronics device 40 is controlled by a central processing unit (CPU) 54, which is coupled to an application-specific integrated circuit (ASIC) 56. CPU 54 executes computer-executable instructions designed to implement features of central electronics device 40. ASIC 56 contains circuitry which is used to implement certain functions of central electronics device 40. For example, ASIC 56 may be coupled to an audio digital-to-analog converter 58 and to a video encoder 60, which provide audio and video output, respectively to a television set included in the home entertainment system.

Central electronics device 40 may further include an IR interface 62 for detecting infrared signals transmitted by a remote control input device, such as a hand-held device or a wireless keyboard. In response to the infrared signals, IR interface 62 provides corresponding electrical signals to ASIC 56. IR interface is one example of means for receiving input from a user. Other examples include one or more buttons on central electronics device 40, an input device connected by a cable, or any other mechanism for receiving input. A standard telephone modem 64 is coupled to ASIC 56 to provide communication with a modem pool of an Internet service provider (ISP). In other embodiments, modem 64 may be supplemented or replaced with an ISDN modem, a cable modem or another suitable communications device.

Also coupled to ASIC 56 are a mask read-only memory (ROM) 66, a flash memory 68, and a random access memory (RAM) 70. Mask ROM 66 is non-programmable and provides storage of computer-executable instructions and data structures. Flash memory 68 may be a conventional flash memory device that can be programmed and erased electronically. Flash memory 68 may store Internet browser software as well as data structures. In one embodiment, a mass storage device 72 coupled to ASIC 56 is included in central electronics device 40. Mass storage device 72 may be used to supply computer-executable instructions and data structures to other components of the central electronics device or to receive data downloaded over the Internet or provided from other consumer electronics devices in the home entertainment system. Mass storage device 72 may include any suitable median for storing computer-executable instructions, such as magnetic disks, optical disks, and the like.

Application software and associated operating system software are stored in flash memory 68, or instead may be stored in any other suitable memory device, such as mask ROM 66 or mass storage device 72. The computer-executable instructions that, according to one embodiment of the invention, are used to adapt video and audio signals to the particular consumer electronics devices connected to the central electronics device 40 by means of jacks 42 are executed by CPU 54. In particular, CPU 54 executes sequences of instructions contained in one or more of mask ROM 66, flash memory 68, and RAM 70 to perform certain steps of the present invention that will be more specifically disclosed hereinafter.

Hub and Spoke Configuration

Figure 6:
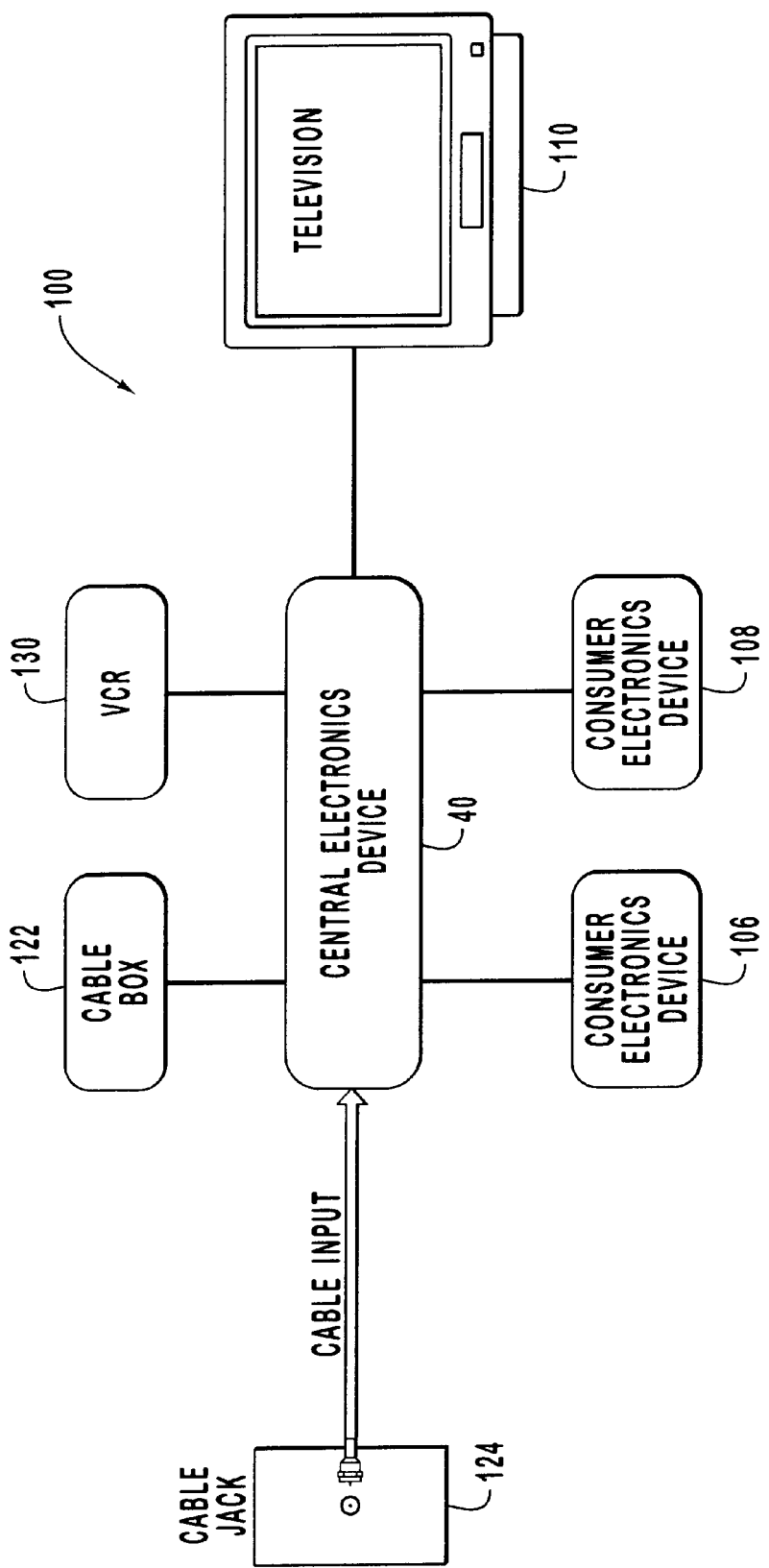
FIG. 6 is a schematic diagram depicting a basic hub and spoke configuration of a home entertainment system.

FIG. 6 illustrates one example of a hub and spoke configuration of a home entertainment system according to the invention. Central electronics device 40 represents the hub of the hub and spoke configuration. Cable box 122, VCR 130, television set 110, and consumer electronics devices 106 and 108 are represented as being connected to central electronics device 40 by one of the spokes of the hub and spoke configuration. Likewise, cable jack 124 can be described as being connected by a spoke to central electronics device 40.

Figure 2:
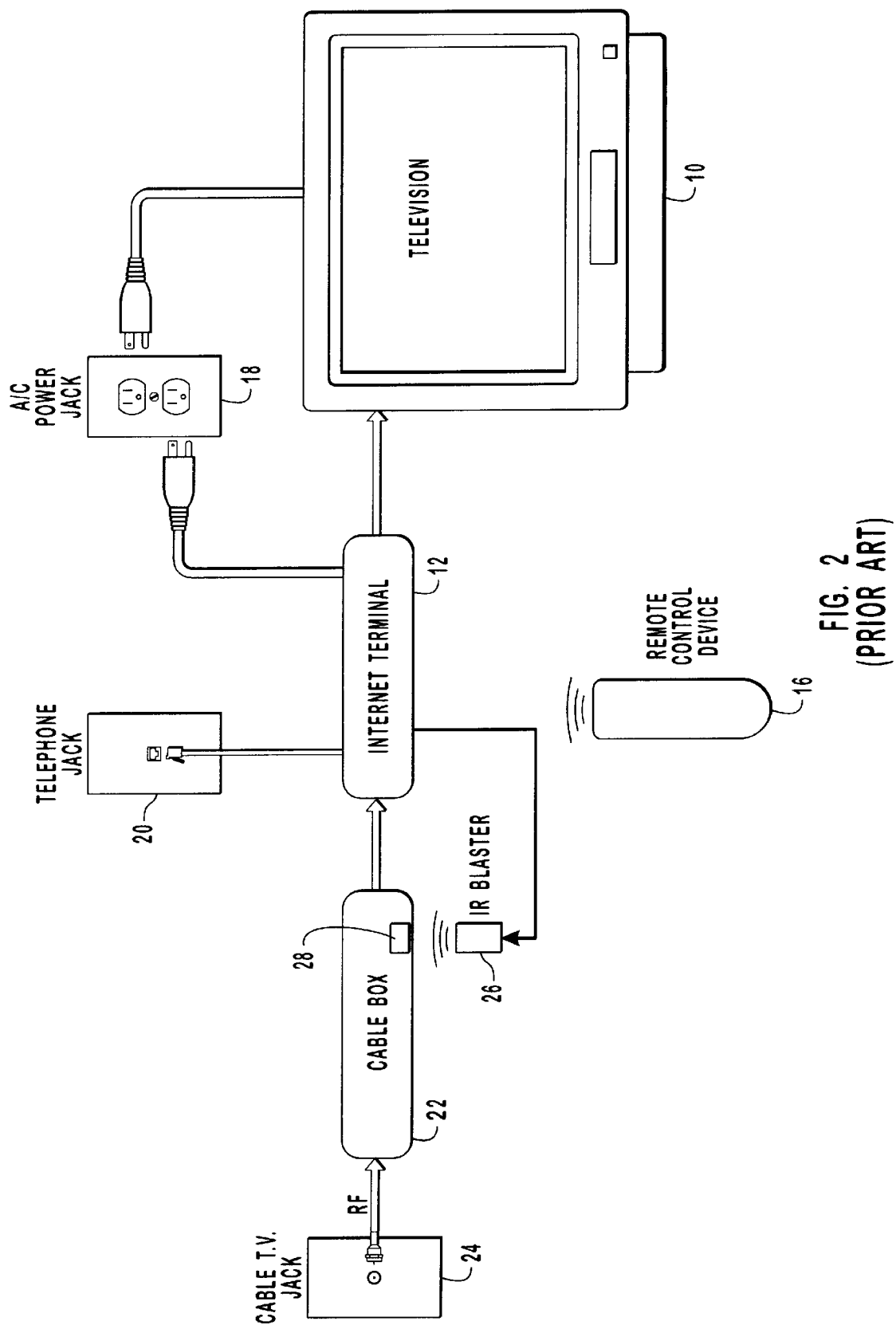
FIG. 2 is a schematic diagram illustrating the home entertainment system of FIG. 1 with the addition of a cable box, wherein the components are connected one with another in a daisy chain configuration.
Figure 3:
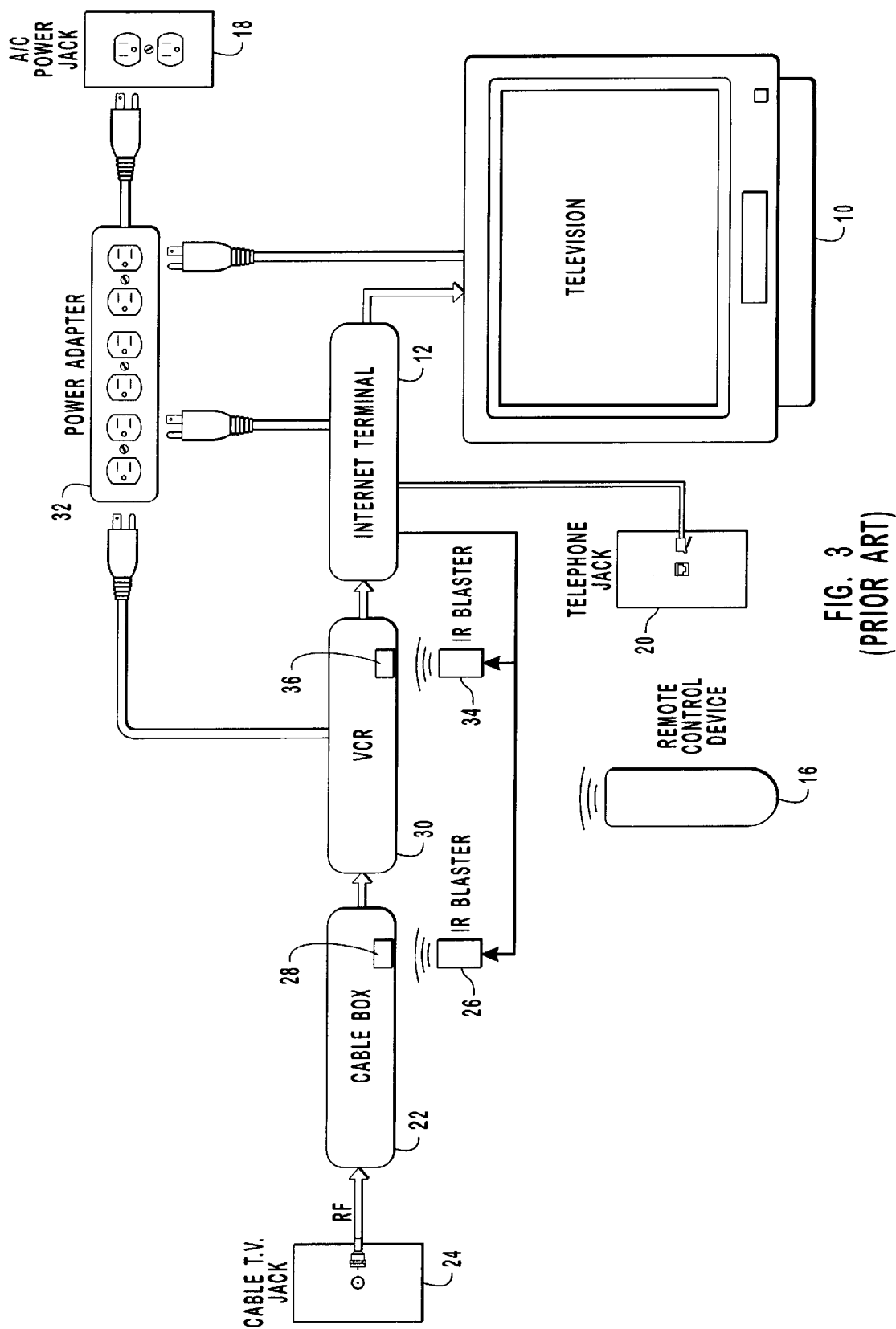
FIG. 3 is a schematic diagram depicting the home entertainment system of FIG. 2 with the addition of a VCR.

The hub and spoke configuration of FIG. 6 contrasts with the daisy chain configuration illustrated in the prior art systems of FIGS. 1–3. In the hub and spoke configuration, any video, audio, or data signals transmitted between cable box 122, VCR 130, television set 110, consumer electronics devices 106 and 108, and cable jack 124 must pass through central electronics device 40. In the daisy chain configuration, signals pass through some or all of the components of the home entertainment system, depending on the position of the transmitting and receiving components in the daisy chain. For instance, in FIG. 3, signals transmitted from Internet terminal 12 to television 10 do not pass through VCR 30, nor is there any mechanism for routing the signals to VCR 30.

A home entertainment system configured according to the hub and spoke configuration of FIG. 6 can have as few as two components (e.g., central electronics device 40 and television 110) or as many components as can be attached to the jacks of the central electronics device. As the number of components increases to three, four, or more, the advantages of the hub and spoke configuration compared to the daisy chain configuration of FIGS. 1–3 become more pronounced.

The hub and spoke configuration of FIG. 6 has several advantages that are not present in the daisy chain configuration. For example, all signals pass through, are received by, or are transmitted by central electronics device 40. Accordingly, central electronics device 40 can control, manage, process, reformat, route, or otherwise respond to any signal transmitted, generated, or received by any of the devices connected to the central electronics device. In the daisy chain configuration of FIGS. 1–3 there is no single device that has access to all signals of the home entertainment system. Providing central access to all signals in the home entertainment system enables the signals to be processed in novel ways. For example, any video or audio signal transmitted in the home entertainment system of FIG. 6, regardless of its source or destination, can be transmitted to VCR 130 and recorded thereat. Other novel methods of processing and routing signals by central electronics device 40 may be understood by those skilled in the art upon learning of the disclosure made herein, and are likewise encompassed by the invention.

Another advantage of the hub and spoke configuration of FIG. 6 is that if one or more of the consumer electronics devices connected to central electronics device 40 fail, the remaining components of the home entertainment system can continue to function. For example, if VCR 130 is disabled, cable television programming can continue to be displayed on television 110. In particular, cable television signals can be passed directly from cable jack 124, through central electronics device 40, to television 110. bypassing a disabled VCR 130. In contrast, if VCR 30 of FIG. 3 is disabled, cable television signals are prevented from passing from cable box 22 to television 10. In order to continue viewing cable television programming on television 10, the user must manually reconfigure the home entertainment system of FIG. 3 by bypassing VCR 30. This basic limitation of the daisy chain configuration is overcome by the hub and spoke configuration of the invention.

The hub and spoke configuration of the invention also greatly simplifies the process of connecting the components of a home entertainment system, maintaining the connections, and adding new consumer electronics devices. If a user adds a new consumer electronics device, the user must merely connect the new device to one of the identical jacks 42 of FIG. 4. For example, if consumer electronics device 106 of FIG. 6 is a new video game console to be included in the home entertainment system, the user must only remember how to perform the basic task of connecting a new consumer electronics device to central electronics device 40. Moreover, the task of connecting a new consumer electronics device to central electronics device 40 is basically the same, regardless of whether the new consumer electronics device is a video game console, stereo equipment, digital versatile disk players (DVDs) or the like. Thus, the user generally does not need to know any special requirements for connecting the video game console. Furthermore, the existing devices, such as cable box 122 and VCR 130 of FIG. 6 do not need to be repositioned, reconfigured, or removed from the home entertainment system 100.

In contrast to the ease of connecting and upgrading home entertainment system 100, adding new consumer electronics devices to a conventional daisy chain system, such as that illustrated in FIG. 3, may be much more difficult. For example, it is very likely that a user will have great difficulty connecting a new video game console to home entertainment system 8. It is not clear where the video game console could be inserted into system 8. Many users would resort to completely disconnecting all components of system 8 from television 10 and replacing them with the video game console each time video games are to be played. In some conventional configurations, this is the only available approach.

Yet another advantageous feature of the hub and spoke configuration is that it permits cable box 122 to tune scrambled television channels while central electronics device 40 tunes non-scrambled channels. In this embodiment, central electronics device 40 stores a copy of an electronic programming guide (EPG) that indicates which channels are scrambled and which are not. Scrambled channels are routed to cable box 122, where they are descrambled and returned to central electronics device 40. Non-scrambled channels, as designated in the EPG, are not routed to cable box 122, but are instead tuned in central electronics device 40. Tuning non-scrambled channels in central electronics device 40 takes advantage of the tuner in device 40 that may be significantly faster than the tuner in cable box 122. This method of tuning non-scrambled channels in central electronics device 40 is possible because all signals are accessible by device 40, which can reroute the signals to cable box 122, if desired.

Figure 7A:
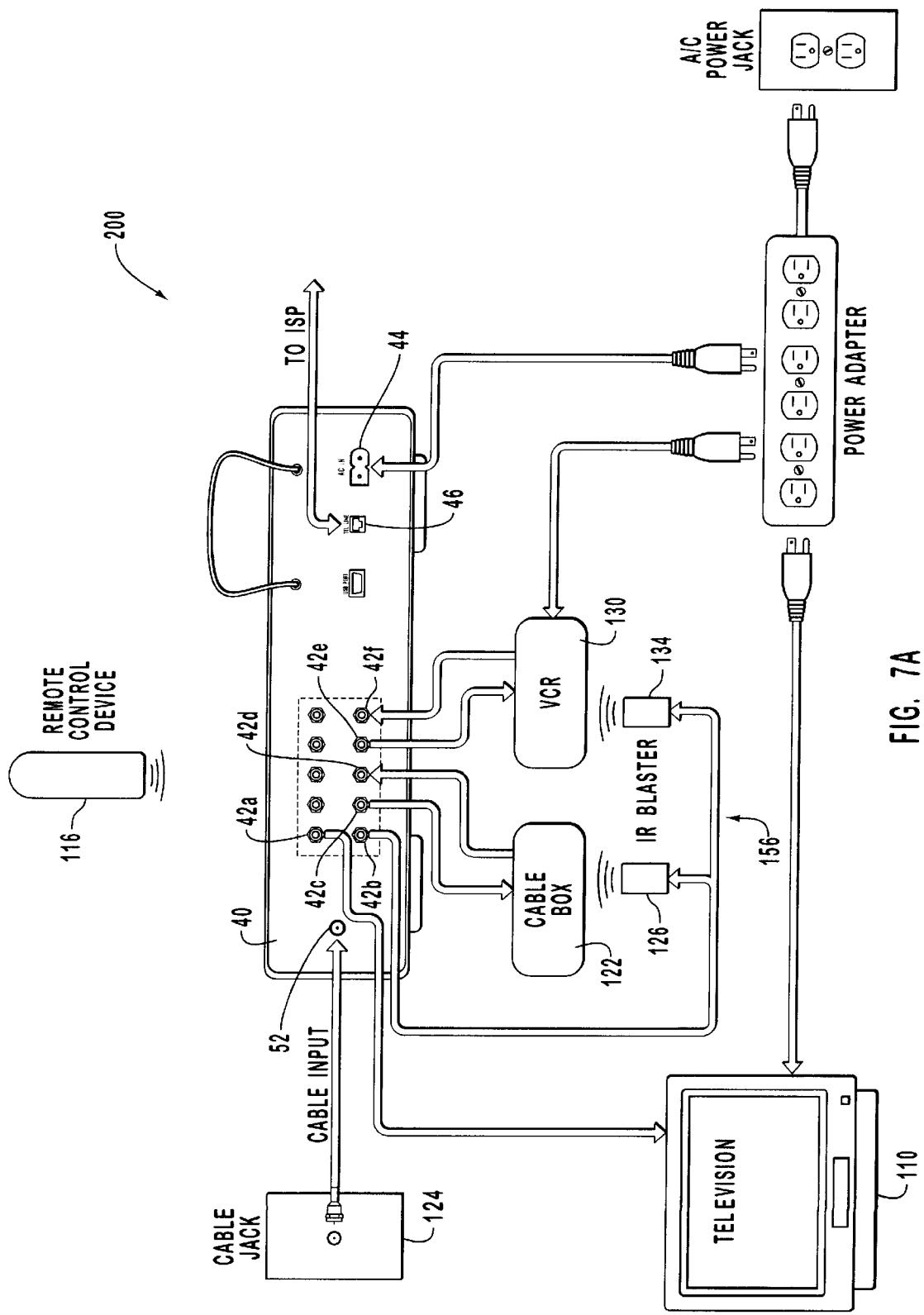
FIG. 7A is a schematic diagram showing the home entertainment system of FIG. 3 having been configured according to the hub and spoke configuration of the invention.

FIG. 7A illustrates a hub and spoke configuration of the invention that corresponds to the daisy chain configuration of FIG. 3. In FIG. 7A, cable jack 124 is connected to coaxial cable input 52, thereby providing cable video signals to home entertainment system 200. AC input 44 receives electrical power, while phone jack 46 provides communication with an ISP. A remote control device 116 enables a user to provide infrared signals to central electronics device 40 to control any desired function of home entertainment system 200.

Television set 110 is connected to jack 42a of central electronics device 40 by means of an appropriate cable that transmits S-video or RCA signals, depending on the type of the television set. As will be further described below, jack 42a and the other jacks 42 are compatible with S-video or RCA signals. Accordingly, the user selects the appropriate cable 154 based on the type of television set 110, connects one end of the cable to the television set and the other end to any desired jack 42 (e.g., jack 42a).

Cable box 122 is similarly connected to central electronics device 40. The user selects the appropriate cables that match the video input and output ports of cable box 122, and connects the cables to the cable box and any desired jacks 42 (e.g., jacks 42c and 42d). Likewise, VCR 130 is connected to jacks 42e and 42f It is noted that the user does not need to remember any special connection techniques when configuring home entertainment system 200, but must merely remember that the video input and output ports of television set 110, cable box 122, and VCR 130 are to be connected to any desired jack 42 using an appropriate cable.

As shown in FIG. 7A, an IR blaster assembly 156, having any desired number of IR blaster emitters (e.g., emitters 126 and 134), can be connected to one of jacks 42. In this example, the user has connected IR blaster assembly 156 to jack 42b and placed emitter 126 near cable box 122 and emitter 134 near VCR 130. As the user enters IR signals using remote control device 116, the signals are relayed to cable box 122 or VCR 130 in a format supported by the particular consumer electronics device that is to be controlled.

Figure 7B:
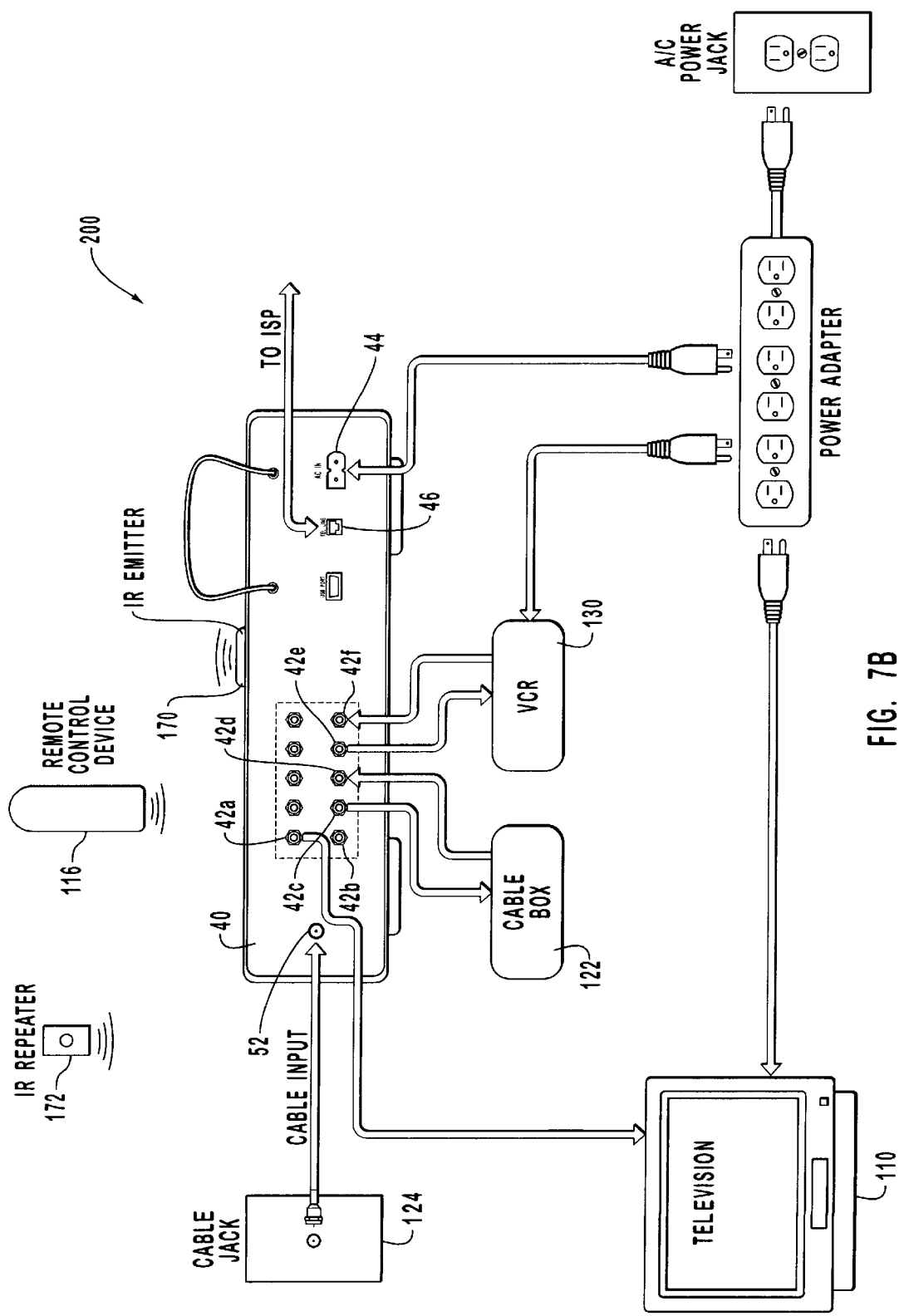
FIG. 7B is a schematic diagram illustrating the home entertainment system of FIG. 7A having an IR emitter and an IR repeater.

Alternatively, as shown in FIG. 7B, the IR blaster assembly is replaced by a single IR emitter 170 included within the housing of central electronics device 40. In this case, the single IR emitter 170 floods the room with IR energy that typically reaches the other consumer electronics devices directly or by reflection. If the room in which the home entertainment system is located does not have enough reflectivity to control the other devices with single IR emitter 170, an IR repeater 172 can be positioned within the room in the line of sight of single IR emitter 170 so as to relay the IR signals to the other consumer electronics devices.

Home entertainment system 200, configured in a hub and spoke architecture, provides the advantages discussed above, including ease of connecting components and upgrading the system, central access to signals, and continued use of the system in the event of failure of one or more components.

Figure 8:
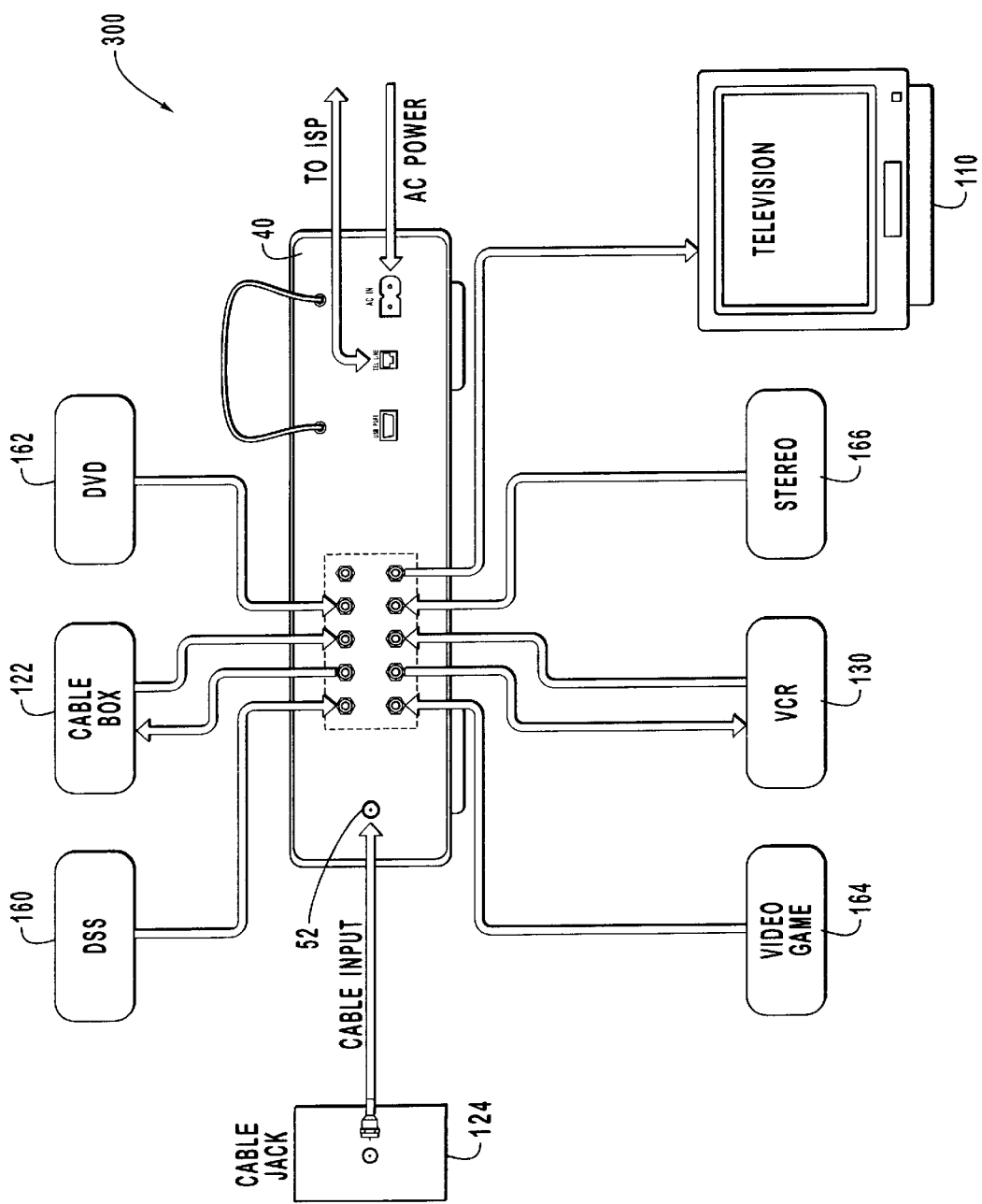
FIG. 8 is a schematic diagram illustrating multiple consumer electronics devices connected to a central electronics device in a hub and spoke configuration.

FIG. 8 shows a home entertainment system including a larger number of consumer electronics devices. Home entertainment system 300 includes central electronics device 40 connected to cable jack 124. Like system 200 of FIG. 7, system 300 of FIG. 8 includes television set 110, cable box 122, and VCR 130 connected to central electronics device 40. It should be noted that the foregoing consumer electronics devices have been connected to different jacks 42 in FIG. 7 and FIG. 8, thereby illustrating that jacks 42 are interchangeable, and the user generally does not need to remember any special connection techniques for the various consumer electronics devices other than connecting them to any desired jack 42.

System 300 further includes a digital satellite system receiver 160, a DVD player 162, a video game console 164, and stereo equipment 166, each connected to one of jacks 42. A further advantage of the central electronics device 40 and the hub and spoke configuration is that they can be used with currently existing consumer electronics devices, such as those illustrated in FIG. 8, as well as other consumer electronics devices that may be available in the future.

Video Recording Capabilities

The invention extends to enhanced video recording methods that are enabled by central electronics device 40 and the hub and spoke configuration of the invention. Because all signals of the home entertainment systems configured according to the invention can be accessed and rerouted by central electronics device 40, a video recording system included in the home entertainment system can be used to record video signals in novel ways.

Figure 9:
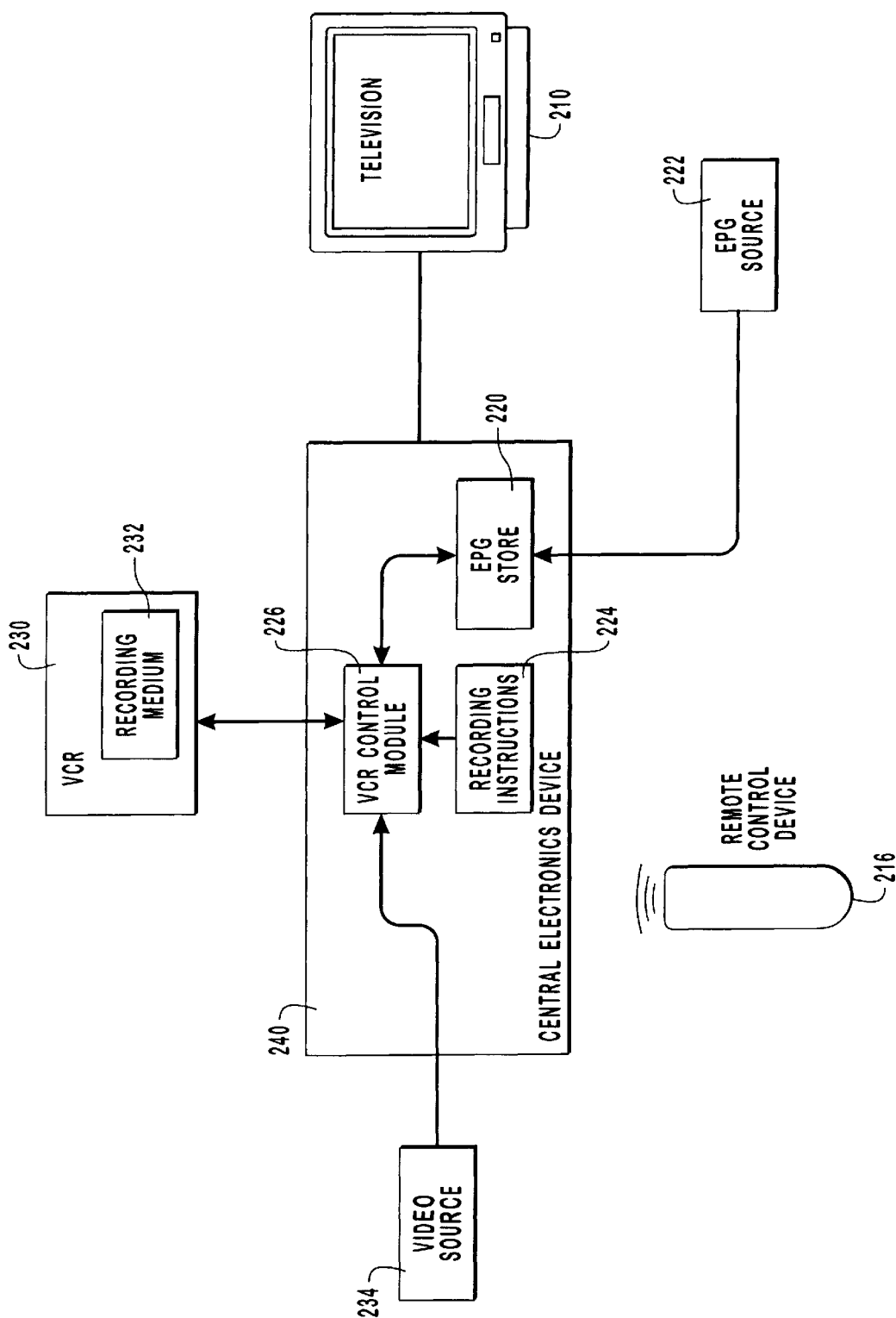
FIG. 9 is a schematic diagram depicting the components of a central electronics device that can be used to insert electronic programming guide information in a recording of video programming on a video recording medium.

As noted in reference to FIG. 5, one embodiment of the central electronics devices of the invention can access and store information retrieved from the Internet or other information sources. For instance, as shown in FIG. 9, central electronics device 240 includes an EPG store 220 for storing an electronic programming guide that includes video programming information relating to television programming available to be viewed for recorded with the home entertainment system. Electronic programming guides are known in the art, and often include the program start time, duration, title, description, ratings, and other information relating to a television program. Central electronics device 240 receives an EPG from an EPG source 222, which may be an Internet site accessible by device 240, a digital satellite service, a cable service provider, or any other source.

Central electronics device also includes recording instructions 224 provided by a user of the system to instruct a VCR control module 226 how to control operation of VCR 230. Recording instructions may comprise instructions stored on a computer-readable medium in central electronics device 240. In this case, the instructions may be stored when a user programs central electronics device 240 in order to cause VCR 230 to record a selected program at some later time. Alternatively, recording instructions 224 may comprise real-time signals input to central electronics device 240 to cause VCR to operate without delay. The user can use remote control device 216 to input recording instructions 224 or may instead use another input device associated with the home entertainment system.

Assume that recording instructions 224 include instructions to cause VCR to record a selected video programming at 3:00 p.m. According to one embodiment of the methods for recording video programming, at a time just before 3:00 p.m., central electronics device 240 causes programming information included in EPG store 220 to be recorded at a selected portion of recording medium 232. For example, VCR control module 226 can receive the title and description of the video programming, or any other EPG programming information, from EPG store 220. The programming information is then transmitted to VCR 230, where it is recorded at the selected portion of recording medium 232. Thus, VCR control module and EPG store 220 represent examples of means for transmitting programming information stored in the EPG and the VCR. The programming information can be used to create a title page for the video programming.

At 3:00, VCR control module 226 transmits the video signal that is received from video source 234 to VCR 230. The video signal, which contains the selected video programming, is recorded on recording medium 232. In the vertical blanking interval (VBI) or the overscan area of the video signal, central electronics device 240 can insert the name of the video programming and the frame number. After recording, VCR control module 226 causes VCR 230 to rewind (or forward) recording medium 232 to a specified location. EPG programming information is then recorded in the VBI or overscan area of recording medium 232 at the specified location and becomes, in effect, indexing information describing the video programming recorded on the recording medium.

Figure 10:
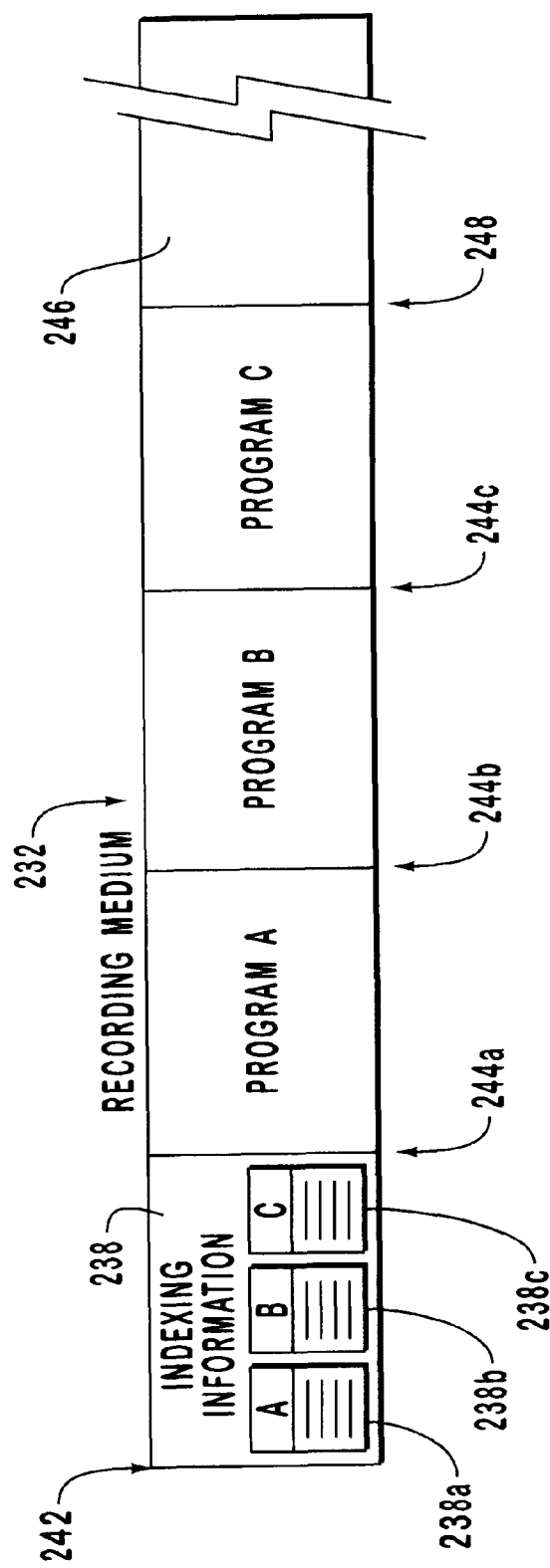
FIG. 10 illustrates one example of programs recorded on the recording medium of FIG. 9.

FIG. 10 represents recording medium 232, which may be a segment of video tape, with programs A, B, and C recorded thereon. Programs A, B, and C have been recorded on recording medium according to a recording method of the invention, one embodiment of which has been described above in reference to FIG. 9. Indexing information 238 has been recorded on the VBI or overscan area of a specified location 242 of recording medium 232. Indexing information includes entries 238a, 238b, and 238c, corresponding to programs A, B, and C, respectively. In this example, indexing information references the location of recording medium 232 at which the beginning of the corresponding programs are recorded. For instance, entry 238a references location 244a, entry 238b references location 244b, and entry 238c references location 244c. Additionally, entries 238a–c can include the program title, description, duration, and/or any other EPG programming information.

Recording medium 232 of FIG. 10 can be used to describe several of an essentially unlimited number of indexing techniques that can be used to record, view, and manage the contents of the recording medium. For example, in one embodiment of the invention, the system of FIG. 9 automatically determines whether recording medium 232 has enough free space 246 to record a program D as instructed by the user of the system. In particular, VCR control module 226 can read indexing information 238 to determine the size of free space 246. If programming information associated with program D stored at EPG store 220 indicates that free space 246 is large enough to record program D, recording medium 232 is used to record program D at the specified time. If, however, free space 246 is not large enough, the user is prompted to insert another recording medium into VCR 230.

Thus, the invention can automatically track the amount of free space 246 available on recording medium 232. The user does not need to manually tabulate the size of free space 246 or to make unreliable estimates. As a result, the system of FIG. 9 can reliably ensure that a video program will be recorded on the recording medium without losing the tail end of the program. In contrast, losing the tail end of a recorded video program when the recording medium is filled has been frequently experienced by users of conventional home entertainment systems.

Moreover, users do not need to manually advance a video cassette to the beginning, of the free space when using the invention. Instead, the indexing information 238 of FIG. 10 identifies start 248 location of free space 246. Thus, when a user desires to record program D, VCR control module 226 can record an entry in indexing information 238 corresponding to program D and then forward (or rewind) recording medium 232 to the start location 248 of free space 246.

Indexing information 238 can enhance the experience of viewing video programming recorded on recording medium 232. For example, indexing information 238 can be displayed to the user by means of television set 210, thereby informing the user of the contents of recording medium 232. Again, the user is relieved of the task of manually tabulating the contents of recording medium 232. As indexing information 238 is displayed to the user, the user can learn of the title, description, and other information relating to the video programming, which typically includes information that is not likely to have been manually tabulated according to conventional techniques.

Optionally, the user can select the desired video programming after viewing indexing information 238 on television 210. For example, the user might decide to view program B of FIG. 10. If so, the user makes the selection using remote control device 216 or any other input device. VCR control module 226 then automatically advances recording medium 232 to location 244b of FIG. 10, where program B begins. Using this method of the invention, the user is relieved of the often time-consuming task of manually searching for the beginning of a video program recorded on a recording medium.

It should be noted that the foregoing and other novel video programming recording methods cannot be practiced with the conventional daisy chain architecture of FIGS. 1–3. In FIG. 3, EPG information that may be stored at Internet terminal 12 is not accessible by VCR 30, and therefore cannot be recorded by the VCR.

Interchangeable Jacks

As noted in reference to FIGS. 4 and 6–8, jacks 42 represent one example of means for electrically connecting each of the plurality of consumer electronics devices to the central device in a hub and spoke configuration. Furthermore, according to one embodiment, jacks 42 of FIG. 4 are identical and interchangeable, and can be used with stereo or mono audio signals and S-video or RCA video signals. Jacks 42 can be identical in the sense that they have the same pin structure.

Figure 11:
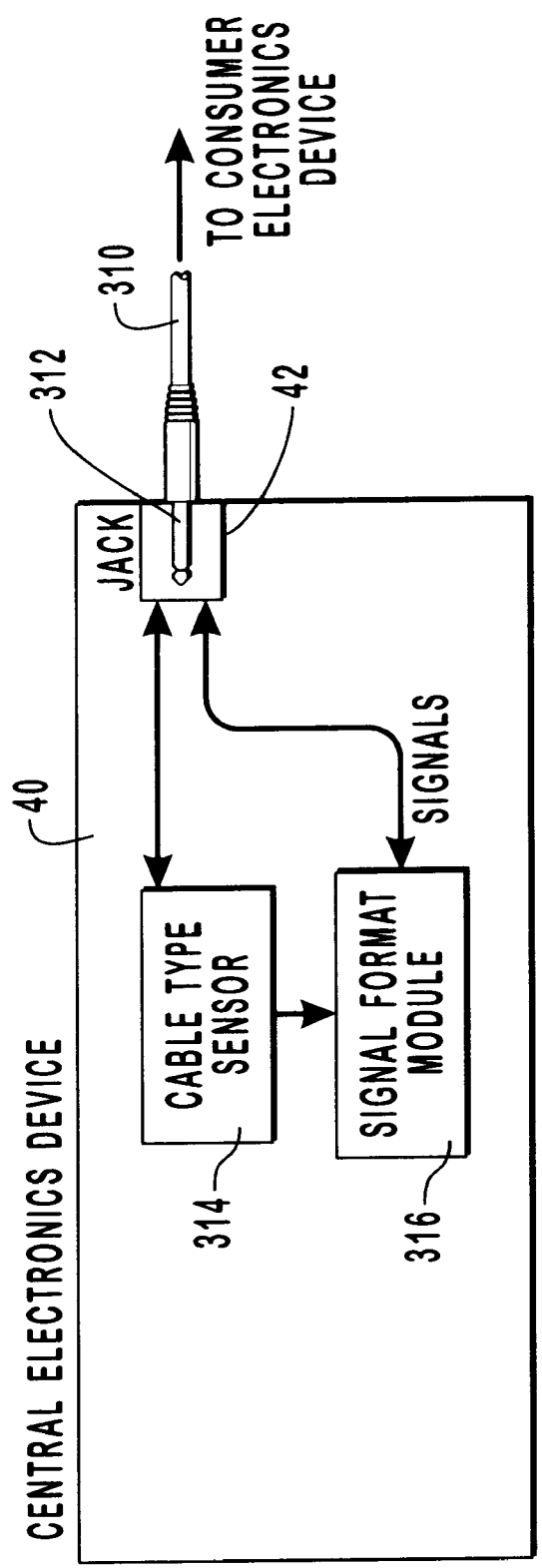
FIG. 11 is a schematic diagram illustrating components of the central electronics device for sensing the cable type connected thereto and formatting electrical signals accordingly.

As shown in FIG. 11, central electronics device 40 includes sensors, other hardware, and/or computer-executable instructions for determining the type of cable 310 connected to jack 42. Cable 310 has been connected to jack 42 as a user connects a consumer electronics device to central electronics device 40. The consumer electronics device may be any desired device, including those depicted in FIG. 8. Cable 310 has a plug 312 that connects with jack 42. Jack 42 and plug 312. according to one embodiment, are a standard jack and plug pair such as those that are used in conventional portable stereo equipment and headphones and in personal computer microphones.

When the user connects cable 310 to jack 42. cable type sensor 314 determines whether the cable is an audio-video (AV) cable or an audio-only cable. For example, if cable 310 is connected to a digital satellite system (DSS) receiver, cable type sensor 314 determines that cable 310 is an AV cable. Cable type sensor 314 then determines whether the cable is an input or output cable with respect to the consumer electronics device. This can be performed by determining whether there is an audio or video signal on the cable. For example, if the user has connected a DSS receiver to central electronics device 40, cable type sensor 314 will determine that cable 310 is an AV output cable associated with a consumer electronics device.

When cable type sensor 314 has characterized cable 310 as AV or audio-only and as an input or output cable, the cable type sensor may need additional information to identify the consumer electronics device associated with cable 310. If so, central electronics device 40 can prompt the user to input the type of consumer electronics device. This can be done by displaying a question or menu choices on a television set connected to central electronics device 40. Although identifying the consumer electronics device may require some user input, it does not require the user to understand whether cable 310 is AV or audio-only or whether it is an input or output cable. In view of the foregoing, cable type sensor 314 represents one example of means for identifying the type of signals that are compatible with the consumer electronics devices connected to central electronics device 40.

Furthermore, in some instances, cable type sensor 314 can deduce the identity of the consumer electronics device connected to cable 310 using the signals carried on cable 310 and conductivity properties of the cable. For instance, cable type sensor 314 can determine whether the cable conducts only in one direction (i.e., whether the cable includes a diode of an IR blaster) or measure the impedance of the jack to determine if the cable is connected to a microphone or is an audio connector.

Figure 12B:
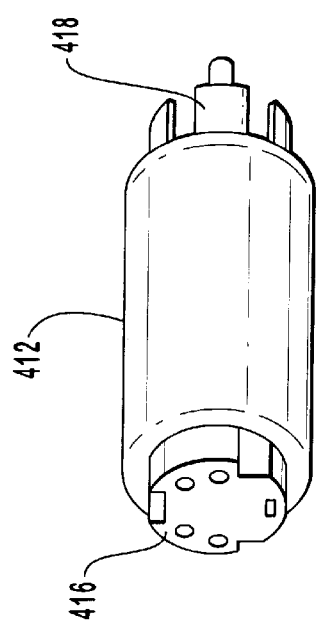
FIGS. 12A and 12B depict a cable that is compatible with both S-video and RCA video signals.
Figure 12A:
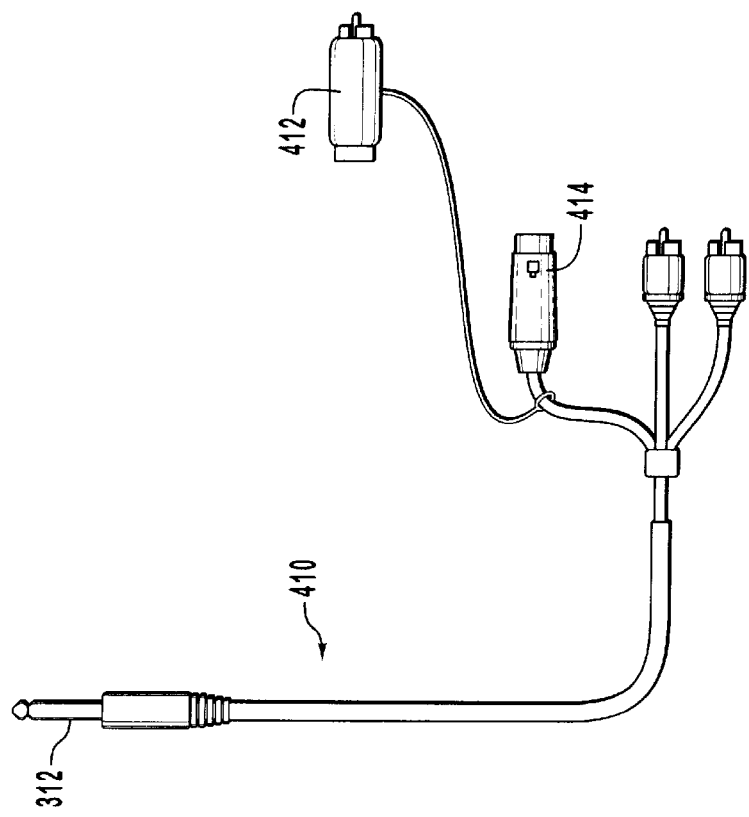

Cable type sensor 314 can also determine whether the user has connected an S-video cable or an RCA cable to jack 42 without the user having to understand the difference between these cable types. FIG. 12A illustrates a cable that is compatible with both S-video and RCA video formats. Cable 410 is supplemented with an S-video-to-RCA video adapter 412, illustrated in FIGS. 12A and 12B, that allows cable 410 to be used with televisions or other consumer electronics devices having either format. Notably, plug 312 of cable 410 that connects to the central electronics device 40 of FIG. 11 is the same, whether cable 410 is used with S-video or RCA signals. Thus, the user inserts plug 312 into any desired jack 42 on central electronics device 40. When the television to be connected does not have an S-video connector, or when the user desires to use the RCA video input, adapter 412 is coupled to the end of connector 414. Adapter 412 has a female S-video socket 416 that mates with the male S-video pins of connector 414. At its other end, adapter 412 has a male RCA video coupler 418. When cable 410 is instead to be used with an S-video format television, adapter 412 remains unconnected to connector 414. In this case, connector 414 is coupled with the corresponding S-video connector of the television.

Cable 410 can therefore be used to connect a television or another consumer electronics device to a home entertainment system without the user understanding the significance of the difference between S-video and RCA connections. The user merely selects a jack 42 on the central electronics device 40 and uses the adapter 412 with cable 410, if necessary.

One possible method by which cable type sensor 314 can determine whether cable 410 is being used with the S-video or RCA format involves sensing whether adapter 412 has shorted together two of the S-video pins. If so, cable type sensor 314 concludes that cable 410 is being used as an RCA cable. Otherwise, cable type sensor 314 concludes that cable 410 is being used as an S-video cable.

Figure 13:
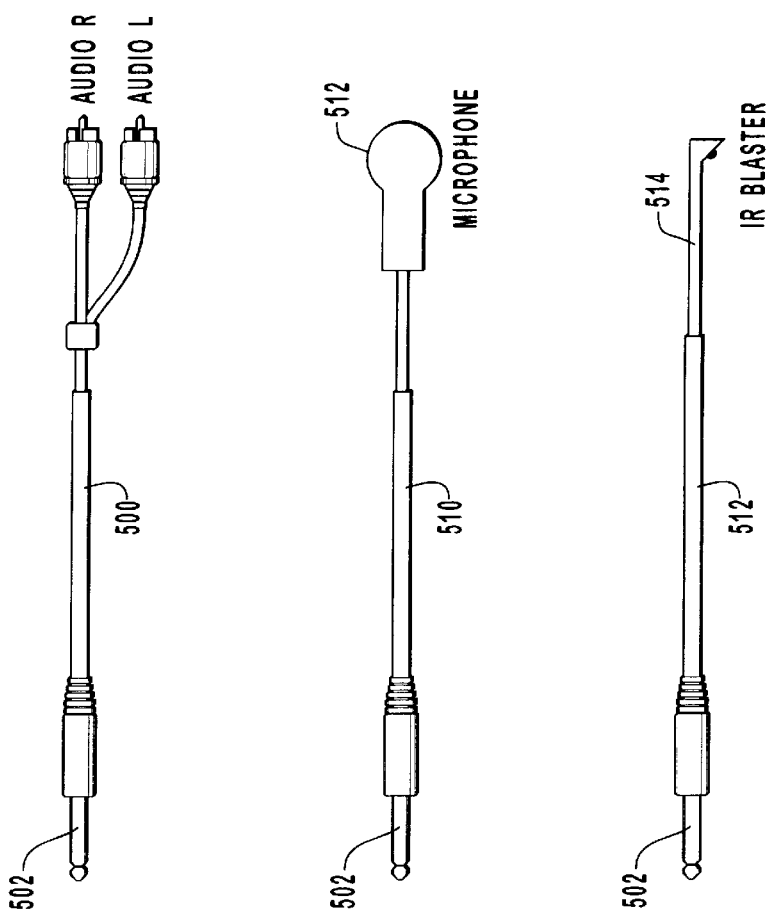
FIG. 13 show other cables that can be connected to the identical, interchangeable jacks of the invention.

FIG. 13 illustrates representative examples of cables that can be used in combination with the interchangeable jacks of the central electronics devices. Cable 500 is a stereo, audio-only cable having a plug 502 compatible with the interchangeable jacks. Likewise, the other cables of FIG. 13 also have a plug 502 compatible with the interchangeable jacks. Cable 510 is a microphone cable providing mono, audio-only output from the consumer electronics device, which in this case, is microphone 512. Cable 512 is a data cable providing input to IR blaster 514, which can be understood as a consumer electronics device as used herein.

Referring now to FIG. 11, when cable type sensor 314 has determined the type of cable (i.e., AV/audio-only and output/input), signal format module 316 adapts any outgoing signals to the proper format of the cable and the associated consumer electronics device. Alternatively, signal format also uses the identity of the cable and the consumer electronics device to respond to incoming signals over cable 310.

When central electronics device 40 is to relay signals from one consumer electronics device to another, it can reformat the signals, as needed, to correspond to the particular consumer electronics devices in question. For example, central electronics device 40 can receive video signals in an S-video format from a cable box and transmit the signals in an RCA format to a television. Thus, signal format module 316 and associated signal transmission hardware represent examples of means for converting an electrical signal between a first format compatible with the central device and a second format compatible with one of the plurality of consumer electronic devices.

Thus, central electronics device 40 can be used to facilitate communication between the various consumer electronics devices connected thereto. As noted herein, central electronics device 40 can have Internet access capabilities, whereby Internet information can be retrieved and displayed on an associated television set. In one embodiment, central electronics device 40 can have dual states of functionality. In particular, central electronics device 40 can be fully booted and powered to a state in which it can access the Internet. Alternatively, central electronics device 40 can be powered to a lower state of functionality, wherein it cannot access the Internet but can still route electrical signals between consumer electronics devices. This lower state can be useful to quickly activate central electronics device 40 when full Internet functions are not needed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States letters patent is:

1. A home entertainment system configured to interconnect a plurality of electronics devices, the system comprising:
   a plurality of electronics devices;
   a central device; and
   a plurality of jacks each having an identical pin structure and being positioned at the central device for electrically connecting each of said plurality of electronics devices to said central device in a hub and spoke configuration, wherein:
   the central device represents the hub of the hub and spoke configuration and each of the plurality of electronics devices is represented as being connected to the central device by one of the spokes of the hub and spoke configuration;
   the central device includes a sensor for identifying a type of cable connects a jack with an electronics device; and each of the plurality of jacks is capable of transmitting signals in any of a plurality of signal formats between the central device and the electronics device that is connected to a particular jack, based on the identified type of cable and the signal format that is compatible with the electronics device that is connected to the particular jack.

2. A home entertainment system as defined in claim 1, further comprising a plurality of cables, each having a first end connected to one of the plurality of electronics devices and a second end connected to one of the plurality of jacks.

3. A home entertainment system as defined in claim 2, wherein the central device comprises:
    means for receiving input from a user;
    means for identifying the type of signals that are compatible with each of said plurality of electronics devices; and
    means for converting a signal between a first signal format compatible with the central device and a second signal format compatible with one of said plurality of electronics devices.

4. A home entertainment system as defined in claim 1, wherein the hub and spoke configuration is such that failure of any one of the plurality of electronics devices does not effect the ability of electrical signals to be transmitted between the central device and any other of the plurality of electronics devices.

5. A home entertainment system as defined in claim 2, wherein at least one of the plurality of jacks is capable of transmitting S-video signals if an S-video cable is connected thereto and RCA video signals if an RCA cable is connected thereto.

6. A method of operating components of a home entertainment system, comprising the steps of:
    providing the components of the home entertainment system, including:
        a central device that has a plurality of jacks having an identical pin structure; and
        a plurality of electronics devices;
    connecting each of the plurality of electronics devices directly to the central device with a plurality of cables, wherein each cable has a first end connected to one of the plurality of jacks and a second end connected to an associated one of the plurality of electronics devices; and
    at the central device, sensing a signal format that is compatible with at least one of the plurality of electronics devices and communicating with said electronics device using the compatible signal format.

7. A method as defined in claim 6, further comprising the steps of:
    receiving, at the central device, a selected signal from a remote control device;
    determining, by the central device, which of the plurality of electronics devices corresponds to the received signal;
    generating, by the central device, an electrical signal having a format that is compatible with the corresponding electronics device and with the one of the plurality of cables that connects the corresponding electronics device to the central device; and
    transmitting the electrical signal through said one of the plurality of cables to the corresponding electronics device, so as to control a function on the corresponding electronics device.

8. A method as defined in claim 6, further comprising the steps of:
    transmitting an electrical signal from a first electronics device selected from among the plurality of electronics devices to the central device; and
    transmitting the electrical signal from the central device to a second electronics device selected from among the plurality of electronics devices.

9. A method as defined in claim 8, wherein the step of transmitting the electrical signal from the central device comprises the step of reformatting the electrical signal from a first format compatible with the first electronics device to a second format compatible with the second electronics device.

10. A method as defined in claim 8, wherein the central device is an Internet terminal, the method further comprising the step of displaying information retrieved from the Internet on a television, wherein the television is one of the plurality of electronics devices.

11. A method as defined in claim 8, wherein the central device is an Internet terminal, the step of transmitting the electrical signal from the first electronics device and the step of transmitting the electrical signal from the central device being conducted without the Internet terminal having been booted to a state in which the Internet terminal is capable of accessing the Internet.

12. A method as defined in claim 11, wherein the step of transmitting the electrical signal from the central device comprises the step of reformatting the electrical signal from a first format compatible with the first electronics device to a second format compatible with the second electronics device.

13. A method as defined in claim 6, wherein the plurality of cables includes a first cable for transmitting an RCA signal and a second cable for transmitting an S-video signal.

14. A central electronics device capable of being connected directly to a plurality of other electronics devices in a home entertainment system, comprising:
    a plurality of identical jacks each being configured to connect to a first end of a cable, wherein a second end of the cable is connected to one of the other electronics devices, at least one of the plurality of identical jacks being capable of transmitting S-video signals if an S-video cable is connected thereto and RCA video signals if an RCA cable is connected thereto;
    means for receiving input from a user; and
    means for identifying the type of signals that are compatible with each of the other of electronics devices.

15. A central electronics device as defined in claim 14, further comprising a modem for receiving information from the Internet.

16. A central electronics device as defined in claim 14, further comprising an electronic programming guide store.

17. A central electronics device as defined in claim 16, further comprising means for transmitting programming information included in an electronic programming guide stored at the electronic program guide store to a video recording system connected to one of the plurality of identical jacks.

18. A central electronics device as defined in claim 14, further comprising a television channel tuner.

19. In a central device included in a home entertainment system, a method of connecting electronics devices to the central device, comprising the steps of:
    selecting an electronics device compatible with S-video signals or RCA video signals;

connecting a cable between the electronics device and one of a plurality of identical jacks at the central device;

determining whether the cable is configured to transmit S-video signals or RCA video signals;

if the cable is configured to transmit S-video signals, then passing S-video signals through the one of the plurality of identical jacks; and if the cable is configured to transmit RCA video signals, then passing RCA video signals through the one of the plurality of identical jacks.

20. A method as defined in claim 19, wherein the step of connecting the cable comprises the step of connecting a first cable that is configured to transmit S-video signals, the method further comprising the steps of:

removing the first cable from the one of the plurality of identical jacks;

connecting a second cable that is configured to transmit RCA video signals to the one of the plurality of identical jacks;

determining that the second cable is configured to transmit RCA video signals; and passing RCA video signals through the one of the plurality of identical jacks.

21. A method as defined in claim 19, further comprising the step of detecting whether the cable is an input cable or an output cable with respect to the electronics device.

22. A method as defined in claim 19, further comprising the steps of:

prompting a user of the central device to input the identity of the consumer electronics device; and receiving input from the user identifying the consumer electronics device.

23. A home entertainment system configured to interconnect a plurality of electronics devices, the system comprising:

a plurality of electronics devices;

a central device including:

means for receiving input from a user;

means for identifying the type of signals that are compatible with each of said plurality of electronics devices; and means for converting an electrical signal between a first format compatible with the central device and a second format compatible with one of said plurality of electronics devices; and means for electrically connecting each of said plurality of electronics devices to said central device in a hub and spoke configuration, wherein the central device represents the hub of the hub and spoke configuration and each of the plurality of electronics devices is represented as being connected to the central device by one of the spokes of the hub and spoke configuration, the means for electrically connecting including a plurality of cables, each having a first end connected to one of the plurality of electronics devices and a second end connected to the central device.

24. A home entertainment system configured to interconnect a plurality of electronics devices, the system comprising:

a plurality of electronics devices;

a central device including:

a plurality of jacks each having an identical pin structure, at least one of the plurality of jacks being capable of transmitting S-video signals if an S-video cable is connected thereto and RCA video signals if an RCA cable is connected thereto; and means for electrically connecting each of said plurality of electronics devices to said central device in a hub and spoke configuration, wherein the central device represents the hub of the hub and spoke configuration and each of the plurality of electronics devices is represented as being connected to the central device by one of the spokes of the hub and spoke configuration, the means for electrically connecting including a plurality of cables, each having a first end connected to one of the plurality of electronics devices and a second end connected to one of the plurality of jacks of the central device.

\* \* \* \* \*

UNITED STATES PATENT AND TRADEMARK OFFICE
CERTIFICATE OF CORRECTION

PATENT NO. : 6,169,879 B1
DATED : January 2, 2001
INVENTOR(S) : Stephen G. Perlman It is certified that error appears in the above-identified patent and that said Letters Patent is hereby corrected as shown below:

Column 2,
Line 51, after "to" and before "an" delete [the]

Column 3,
Line 46, after "transmitted" change "form" to -- from --
Line 53, after "daisy" change "chan" to -- chain --

Column 5,
Line 29, after "a" change "pore" to -- more --

Column 6,
Line 12, after "FIG. 13" change "show" to -- shows --

Column 7,
Line 62, after "jacks 42" and before "are" delete [have]

Column 8,
Line 63, after "suitable" change "median" to -- medium --

Column 11,
Line 5, after "200." change "AC" to -- A/C --

UNITED STATES PATENT AND TRADEMARK OFFICE
CERTIFICATE OF CORRECTION

PATENT NO.   : 6,169,879 B1
DATED        : January 2, 2001
INVENTOR(S)  : Stephen G. Perlman It is certified that error appears in the above-identified patent and that said Letters Patent is hereby corrected as shown below:

Column 12,
Line 29, after "viewed" change "for" to -- or --

Column 16,
Line 66, after "cable" and before "connects" insert -- that --

Column 17,
Line 25, before "the ability" change "effect" to -- affect --

Signed and Sealed this

Eighteenth Day of December, 2001

Attest:

JAMES E. ROGAN
*Attesting Officer*   *Director of the United States Patent and Trademark Office*